(12) United States Patent
Adams et al.

(10) Patent No.: US 12,325,429 B2
(45) Date of Patent: Jun. 10, 2025

(54) METHOD AND SYSTEM FOR CROWD SOURCED DANGEROUS DRIVING DETECTION AND ACCIDENT MITIGATION

(71) Applicant: BlackBerry Limited, Waterloo (CA)

(72) Inventors: Neil Patrick Adams, Waterloo (CA); Jeremy Lawson Kominar, Waterloo (CA)

(73) Assignee: BlackBerry Limited, Waterloo (CA)

( * ) Notice: Subject to any disclaimer, the term of this patent is extended or adjusted under 35 U.S.C. 154(b) by 233 days.

(21) Appl. No.: 18/098,779

(22) Filed: Jan. 19, 2023

(65) Prior Publication Data

US 2024/0246544 A1 Jul. 25, 2024

(51) Int. Cl.
*B60W 40/09* (2012.01)
*G06V 20/62* (2022.01)

(52) U.S. Cl.
CPC ........... *B60W 40/09* (2013.01); *G06V 20/625* (2022.01); *B60W 2420/403* (2013.01); *B60W 2554/4045* (2020.02)

(58) Field of Classification Search
CPC ........... B60W 40/09; B60W 2420/403; B60W 2554/4045; G06V 20/625; G07C 5/008; G08G 1/0175; G08G 1/096725; G08G 1/096741; G08G 1/0112; G08G 1/0129; G08G 1/0141; G08G 1/04; G08G 1/096775; G08G 1/167
See application file for complete search history.

(56) References Cited

U.S. PATENT DOCUMENTS

| | | | |
|---|---|---|---|
| 11,124,195 B1 * | 9/2021 | Gu | G07C 5/008 |
| 11,686,588 B2 * | 6/2023 | Shirani-Mehr | G01C 21/3476 |
| | | | 701/435 |
| 2016/0133130 A1 * | 5/2016 | Grimm | G08G 1/0129 |
| | | | 340/905 |
| 2021/0020042 A1 * | 1/2021 | Arndt | G08G 1/052 |
| 2021/0074150 A1 * | 3/2021 | Valeri | G08G 1/096741 |
| 2021/0312724 A1 * | 10/2021 | Petri | H04W 4/40 |
| 2021/0319690 A1 * | 10/2021 | Ogawa | G08G 1/0125 |
| 2022/0222980 A1 * | 7/2022 | Dignimont | G06F 21/64 |
| 2022/0327932 A1 * | 10/2022 | Nakaya | G08G 1/0133 |
| 2022/0355802 A1 * | 11/2022 | Chaves | B60W 40/09 |
| 2024/0353229 A1 * | 10/2024 | Biebl | G01C 21/28 |
| 2024/0364729 A1 * | 10/2024 | Kaler | H04L 63/083 |

FOREIGN PATENT DOCUMENTS

DE 102019202377 A1 9/2019

OTHER PUBLICATIONS

European Patent Office (EPO): Extended European Search Report (EESR) for Application No. 24150818.3, dated Sep. 12, 2024, 13 pages.

* cited by examiner

*Primary Examiner* — Thomas Ingram
(74) *Attorney, Agent, or Firm* — Moffat & Co (57) ABSTRACT

A method at a computing device for a vehicle, the method including observing, using sensors of the vehicle, behavior of an external road user; producing at the computing device a normalized safety score for the external road user; recording identifying information for the external road user; and reporting the normalized safety score and identifying information to a server.

18 Claims, 6 Drawing Sheets

METHOD AND SYSTEM FOR CROWD SOURCED DANGEROUS DRIVING DETECTION AND ACCIDENT MITIGATION

FIELD OF THE DISCLOSURE

The present disclosure relates to vehicle systems, and in particular relates to collection of data on road users by vehicle systems.

BACKGROUND

The use of roadways by vehicles, pedestrians and other road users can be risky. Certain locations may be poorly designed, have traffic levels that are extremely high at certain times of the day, have the sun directly in front of drivers at particular times, among other hazards.

Also, certain drivers on the roadway are riskier than others. Such drivers may drive in a way that can cause more accidents, such as by braking hard consistently, changing lanes without signaling, impeding on neighboring lanes of a roadway, speeding, among other risk factors.

BRIEF DESCRIPTION OF THE DRAWINGS

The present disclosure will be better understood with reference to the drawings, in which.

DETAILED DESCRIPTION OF THE DRAWINGS

The present disclosure provides a method at a computing device for a vehicle, the method comprising: observing, using sensors of the vehicle, behavior of an external road user; producing at the computing device a normalized safety score for the external road user; recording identifying information for the external road user; and reporting the normalized safety score and identifying information to a server.

The present disclosure further provides a computing device for a vehicle, the computing device comprising: a processor; and a communications subsystem,
wherein the computing device is configured to: observe, using sensors of the vehicle, behavior of an external road user; produce a normalized safety score for the external road user; record identifying information for the external road user; and report the normalized safety score and identifying information to a server.

The present disclosure further provides a computer readable medium for storing instruction code, which, when executed by a processor of a computing device for a vehicle cause the computing device to: observe, using sensors of the vehicle, behavior of an external road user; produce a normalized safety score for the external road user; record identifying information for the external road user; and report the normalized safety score and identifying information to a server.

The present disclosure is directed to the use of synthetic sensors to gather a profile of vehicles using a roadway. A plurality of vehicles with such synthetic sensors can then crowd source information about road users and locations. Such profiles can be used to generate a safety score for each vehicle seen on the roadways.

Various driving patterns may be observed, such as, but not limited to, determining whether the vehicle signals its turns or lane changes; determining whether the vehicle is speeding; determining whether the vehicle passes on the right hand side in jurisdictions with left hand drive vehicles (or passes on the left hand side in jurisdictions with right hand drive vehicles); determining whether the vehicle brakes hard; determining whether the vehicle stays in its lane, or whether it veers into other lanes; determining whether the vehicle has working lights; determining whether the vehicle has tires with low tread; among other factors.

Each dangerous driving pattern may be weighted based on its severity to come up with a safety score.

In some embodiments, observations of good driving may be made by the synthetic sensors and such good driving observations may be used as a factor in the safety score.

Further, in some cases, the dangerous driving patterns may be performed based on external, mitigating factors, and such mitigating factors may be used when computing the safety score. For example, if a vehicle veers into another lane due to debris on the roadway, this may mitigate the negative values applied to the safety score.

In some embodiments, it is assumed that each vehicle only has one driver for simplicity. However, in other embodiments, if driver identification or differentiation is possible for a particular vehicle, such information can be used to distinguish safety scores based on the driver. Various options for driver identification may include image processing from captured images, differentiation based on route/location/time, especially if different driving behavior is detected, driver behavior observed, among other options.

Each vehicle with a synthetic sensor system may report the safety scores for the vehicles observed, along with identifiers for such vehicles, to a network based server. Such network based server may match the identifiers for the vehicles and build a safety score of vehicles typically seen on roadways in a particular area.

The accuracy of the safety score may improve over time as more vehicles and dangerous driving patterns are observed.

Further, the network server may provide a confidence score per identified vehicle. In particular, the confidence score may increase as more reports for the particular vehicle are received.

Once safety scores are available, and in some cases once a confidence score has reached a threshold, various actions may be taken to improve road safety of the vehicle with the synthetic sensor system. The safety information provided by the vehicles with synthetic sensor systems can also be used to improve road safety of the vehicles without synthetic sensor systems.

In one embodiment, the vehicle with the synthetic sensor system may warn the driver of the vehicle that one or more vehicles in the area might be dangerous. In some cases, specific information about the dangerous vehicle may be provided. For example, a display on the vehicle or an audio warning may indicate the vehicle in front of the driver has a history of not signaling and braking hard. In some cases, the safety information provided by the vehicles with synthetic sensor systems can help the network build up knowledge of dangerous vehicles in an area. The network can also warn a vehicle without a synthetic sensor system of dangerous vehicles nearby.

In one embodiment, the vehicle may make driving recommendations to avoid vehicles with dangerous driving patterns. For example, a message may be provided to the driver to move over to the right most lane to avoid a speeding vehicle approaching from behind, or to "slow down to avoid passing a vehicle ahead".

In one embodiment, if the vehicle has autonomous driving capabilities, the vehicle may take direct action such as changing lanes, changing routes, or slowing down.

In one embodiment, the action may be to route the vehicle using the "safest route". For example, when requesting a route from point A to point B using a vehicle system, options such as the shortest route or the fastest route are often provided to a driver. In this case, the "safest route" may be calculated to avoid particular locations where more incidents occur, areas that have reported dangerous driving vehicles at the moment, areas where dangerous driving vehicles may be at the time of the vehicle reaching that location, for example based on past driving patterns for such dangerous vehicles, among other options.

In some cases, vehicle data may be anonymized to protect privacy, and the instructions to a driver may simply be to take extra caution, for example because a vehicle in the area is known to brake hard. Other options are possible.

These and other aspects are described below.

Vehicle Software System

Modern vehicles have many sensors. Such sensors may be distributed within the various computing nodes on the vehicle, where each computing node may have access to zero, one or more sensor drivers. Such sensor nodes may further have different manufacturers, and operate using different operating systems. Similarly, other distributed systems could have a plurality of nodes where the nodes need to communicate with each other.

Sensors, or groups of sensors, may be used to generate information that could be useful to one or more applications. In a modern vehicle, information from one or more physical sensors may be processed to create an "Insight" that may be valuable in a system. Such one or more physical sensors and the processing associated therewith may be referred to logically as a micro-service or a Synthetic Sensor (SS). The terms micro-service and synthetic sensor are used interchangeably herein.

Specifically, a Synthetic Sensor can be a special application that is deployed dynamically in a system running on a vehicle. Its role is to watch for specific signals emitted from hardware sensors in a vehicle and dynamically synthesize insights based on these signals. An example of such a Synthetic Sensor is the detection of a child left behind in a vehicle cabin that is becoming hot. Such a Synthetic Sensor would watch vehicle signals such as ignition state, cabin temperature, child seat lock state, among others.

In another example, a Synthetic Sensor could use cameras, radar, Lidar, or other sensors on the vehicle to derive an insight for a driving safety score of another road user.

Synthetic Sensors may exist in other types of applications, including but not limited to medical applications, manufacturing applications, Internet of Things applications, among others, and the present disclosure is not limited to vehicle applications. Vehicle applications are provided for illustration below.

Insight is the term used herein to describe any computer-created interpretation of basic sensor data. Insights can be as straight forward as data aggregation or correlation or as complex as artificial intelligence and machine learning. For example, a temperature sensor providing high and low watermarks for notification may be considered an "insight". For location services, geofencing is an insight. For cameras, external road user recognition may be an insight. The use of camera and the associated image analysis may generate an insight whether a passing vehicle is speeding. The use of a combination of sensors such as temperature sensors and cameras, may be used with an artificial intelligence model to determine whether a car seat is occupied in a hot vehicle, which may be an insight. Many other examples of insights are possible.

In one embodiment, the vehicle applications may be implemented in a system providing consistent access to vehicle data and intelligent insights in a way that is familiar and accessible to developer communities. Such environment may allow cloud developers to extend their reach to the edge within the vehicle through the development of Synthetic Sensors which derive intelligent insights on vehicle data using common cloud development technologies and paradigms. Such environment may provide consistent access to vehicle data such that Synthetic Sensors can be written and deployed to a broad vehicle base without bespoke customization.

Insights may be generated based on a processor running on a first installation or domain, but they often need to be shared with authorized software modules running in external domains. Each may be run using different operating systems.

Figure 1:
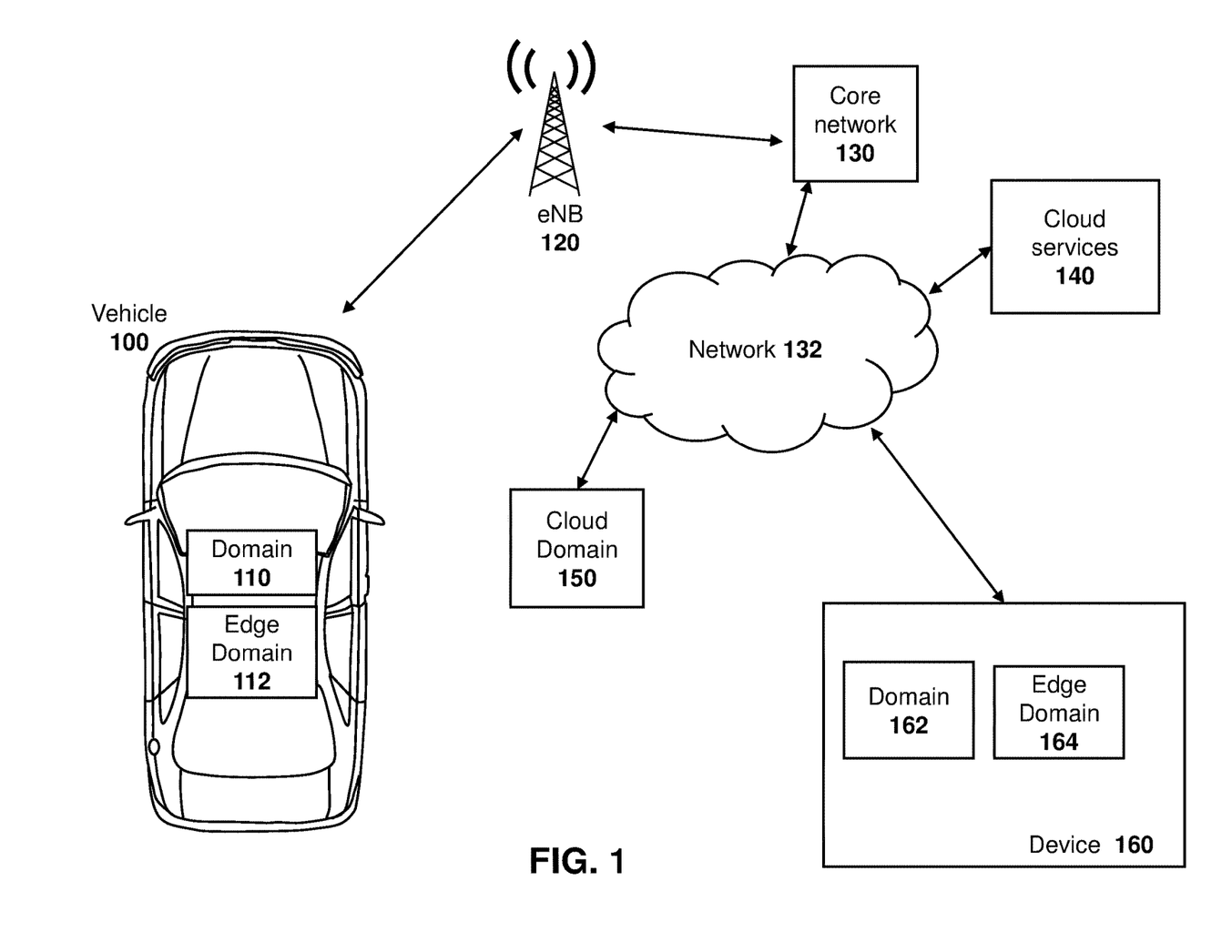
FIG. 1 is a block diagram showing an example system having insight generators and insight consumers.

Reference is now made to FIG. 1, which shows an example system showing various generators and consumers of insights. The embodiment of FIG. 1 is merely provided for illustration purposes, and in some cases fewer participants in a system will exist. In other cases, more participants in a system will exist.

In the embodiment of FIG. 1, a vehicle 100 may be equipped with a computing system and a communications system. Part of the computing system may include a domain 110, which, as described below, may have applications that consume insights. Further, part of the computing system on vehicle 110 may include an edge domain 112. In some embodiments, edge domain 112 may generate insights. However, in other cases, insights may be generated within domain 110 or consumed within edge domain 112.

In the example of FIG. 1, vehicle 100 communicates utilizing a communications system with an access point, such as a cellular base station, shown in FIG. 1 as eNB 120. The base station may communicate with a core network 130 which may then forward communications through a network 132 to a cloud services provider 140. The communication network 132 may, for example, be a wide area network such as the Internet.

In other embodiments, rather than a core network 130, any technology associated with a particular cellular or wireless communications protocol may be used.

In some embodiments, cloud services 140 may provide for the compilation of insights such as insights related to other road users.

In some embodiments, a cloud domain 150 may generate or consume insights. Cloud domain 150 may communicate through network 132 with a cloud services provider 140 and may communicate with other domains such as domain 112 on vehicle 100 in some cases.

Further, rather than a vehicle, a device 160 may consume insights. Device 160 may be any computing device capable of generating or consuming such insights, and could include Internet of Things devices, mobile devices, medical equipment, vehicles or equipment associated with vehicles, among other options. Device 160 may communicate through network 132 utilizing various wired or wireless technologies, including but not limited to Ethernet, fiber, cellular, Wi-Fi, satellite, among other options.

Device 160 may include a domain 162 which may, in some embodiments, consume insights. Further, device 160 may include an edge domain 164 which may, in some cases, generate insights. However, in other cases, domain 162 may generate insights and edge domain 164 may consume insights.

Further, while the embodiment of FIG. 1 shows only two domains within vehicle 100 or device 160, in practice only one or many domains may exist within the vehicle 100 or the device 160, and the present disclosure is not limited to only having two domains within any particular device. In particular, a device 160 may be solely used for generating insights, in which case it will have only a single domain. For example, device 160 may be a camera associated with an intersection, or a sensor on a street light, or other sensors, any of which may be capable of generating insights. In other cases, device 160 may solely consume insights and again have only one domain. In other cases, a device 160 or vehicle 100 may have a plurality of domains along with edge domain 112.

Figure 2:
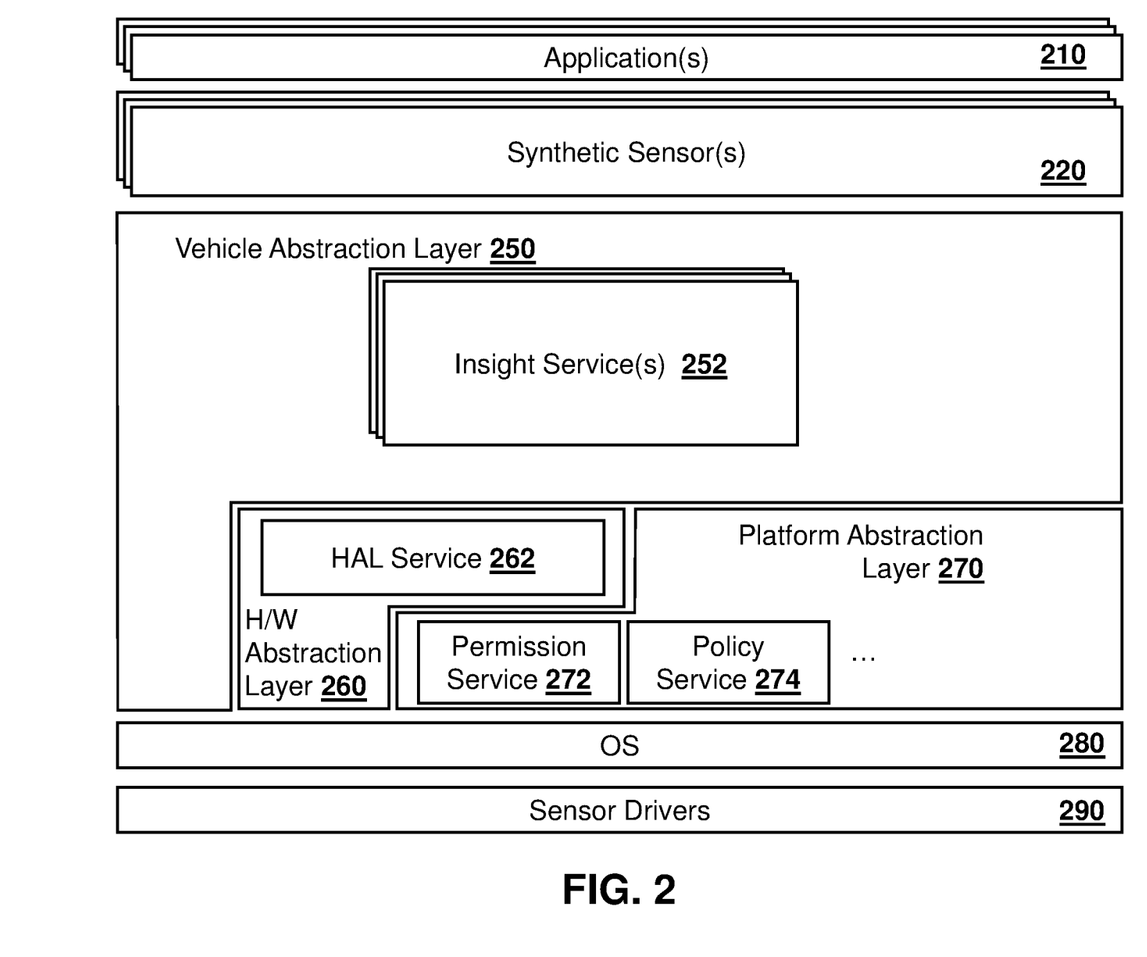
FIG. 2 is a block diagram showing an example architecture for an edge domain.

Each domain or edge domain may have an architecture that is OS-agnostic. Specifically, the domains shown in FIG. 1 may be implemented as a variety of domains, where different domains may have different operating systems. For example, in vehicle systems, different vehicle manufacturers may use different operating systems. Therefore, a system architecture for an edge domain may use abstraction layers to allow the system to be implemented on different platforms. Reference is now made to FIG. 2.

In the embodiment of FIG. 2, applications 210 may be part of an applications layer. An application may in some cases be user facing and utilize synthetic sensors 220 to obtain insights.

Synthetic sensors 220 are part of a synthetic sensor framework. In particular, developers may use the synthetic sensor framework to build synthetic sensors. The framework exposes a mechanism to define actions for lifecycle events, services for request/response application program interface (API), among other actions.

The framework of FIG. 2 may further define mechanisms for authentication and authorization of requests and events based on policies. When the synthetic sensor is installed/uninstalled/updated, an Install & Update Service may interact with a Permission Service to update the authentication and authorization policies.

Other services are also possible.

Synthetic sensors 220 may communicate, for example, through an interface with a vehicle abstraction layer (VAL) 250. Vehicle abstraction layer 250 provides insightful, value-added interfaces for access to vehicle data. It accesses sensor drivers and hardware via a hardware abstraction layer 260.

The vehicle abstraction layer 250 further provides access to insights based on vehicle data. Insights are inferences based on the vehicle data and may be as simple as aggregation or as complex as a machine learning model. For example, a Location Insight Service may provide coordinate location data as well as higher level insights such as geofencing.

Insights may therefore be provided as part of insight services 252 in the embodiment of FIG. 2. Such insight services 252 control access to a normalized form of vehicle data and provide value added inferences. Examples can include a location service which provides coordinate location data in a consistent format as well as insights such as geo-fencing. Examples can further include a seat service which provides a myriad of seat information such as belt status, weight, position, and child lock status. A further example may include a camera service which provides video stream for an external camera and possibly functions such as conversations and/or clipping. A battery service may provide insights and access to batteries such as charge state, consumption, projected hours remaining, projected range, among other data. A door service may provide an abstraction for vehicle doors and the door status.

Insight Services generally do not interact directly with sensor hardware to access sensor data, instead they leverage the hardware abstraction layer 260. This separation provides a clear distinction between the responsibilities of the hardware abstraction layer 260 (sensor integration and normalizing sensor data) and the vehicle abstraction layer 250 (managing access to vehicle data and providing value-add insights).

Insight services 252 may leverage sensor data from multiple hardware abstraction layers in order to provide vehicle abstraction and value-add insights.

The hardware abstraction layer (HAL) 260 is focused on the integration of sensors, the normalization of sensor data, and is a barrier between safety certified and non-certified software. This may be done through HAL services, where each HAL service 262 may provide three key functions, namely integration to the underlying sensor; normalization of the sensor data; and, if required, providing a barrier between the safety certified and non-certified software.

Further, returning to insight service 252, one function of the insight service may be to enforce access control to normalized sensor data and insights. In order to validate the authentication and authorization of service clients the vehicle abstraction layer services may leverage the policy service 274 and Permission Service 272 from the platform abstraction layer 270.

While the hardware abstraction layer discussed above describes hardware integration, the platform abstraction layer (PAL) 270 encapsulates key aspects of the underlying operating system 280 and platform that allow the system to be ported to different platforms by: defining consistent interfaces to key platform functionality; encapsulating underlying OS specifics into an OS binding component; and supporting high-level/course-grained abstractions beyond the rudimentary OS capabilities.

PAL interfaces are exposed both internally to the HAL and VAL and externally to clients such that the power and portability of these components is extended to clients.

The PAL 270 may have various services. A Permission Service 272 and a policy service 274 are shown in the embodiment of FIG. 2. In some cases, other services such as a lifecycle service, a process service and an install and update service may further be provided.

In particular, policy service 274 is responsible for persisting policy values; performing policy queries; notifying policy changes; resolving policy priority; and controlling policy modification. Policies here deal with configuring the behavior of various components, and each policy may have a unique name, a string encoded configuration value, and a priority.

Permission service 272 is the central authority for the domain permissions. Service capabilities that are protected by a permission leverage the Permission Service in order to determine whether the appropriate permissions have been granted or not. In one embodiment, the permission system authentication is underpinned by the Portable Operating System Interface (POSIX) process user and group assignments (UID/GID). The Permission Service identifies/authenticates components based on the UID assigned to their process in the underlying operating system. This UID is carried by the underlying operating system and is deemed legitimate (accessed and managed by the underlying OS using proven/trusted schemes).

Thus, with the embodiment of FIGS. 2, a system which is agnostic to the operating system 280 and to specific sensor drivers 290 is provided.

Capturing Traffic Behavior

Figure 3:
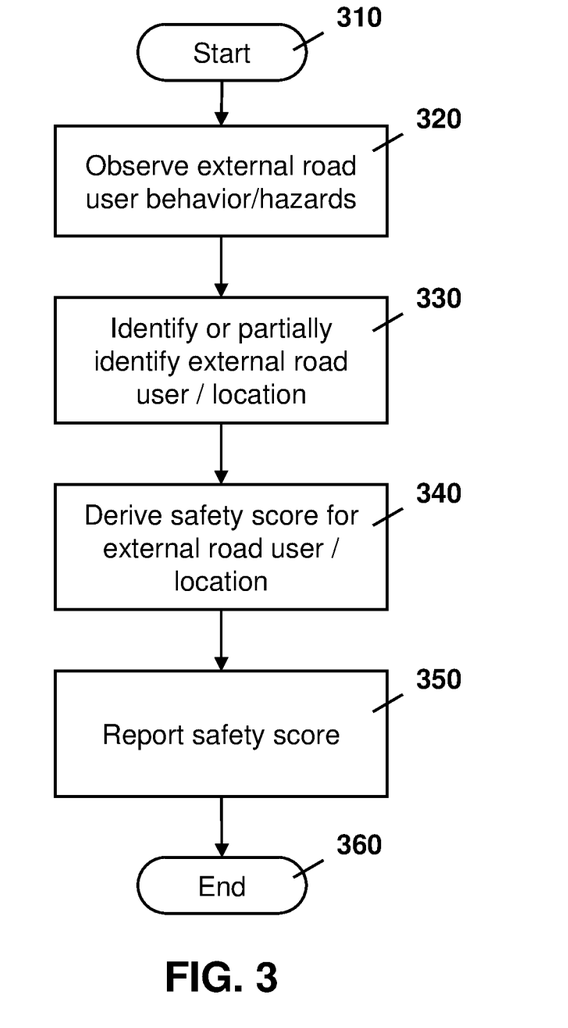
FIG. 3 is a process diagram for creating and reporting a safety score.

Reference is now made to FIG. 3, which shows a vehicle generating insights regarding the behavior of road users around such vehicle. In the embodiment of FIG. 3, the process starts at block 310 and proceeds to block 320 in which the computing device on the vehicle may observe external road user behavior.

For example, utilizing the embodiments of FIGS. 1 and 2, the vehicle may have one or more sensors capable of providing information on the external environment. Such sensors may include, for example, externally facing cameras, radar, lidar, communications subsystems capable of receiving communications from other vehicles, among other options.

Such sensor data may then be abstracted and provided to an insight service 252 which may then be used by synthetic sensors 220 to generate insights regarding the sensor data. In some cases, the insight service or synthetic sensor may use image analysis to extract desired information from the images/videos captured by the camera.

The observations at block 320 may be any behavior that an external road user is exhibiting. For example, if the external road user is seen to change lanes or turn without using a turn signal, this may be an observation at block 320. Conversely, if the vehicle does signal its turns or lane changes, this may also be an observation at block 320.

Similarly, if the vehicle passes in the incorrect lane, whether on the right hand side for a left hand drive vehicle or the left hand side for a right hand driver vehicle, this may be an observation at block 320.

If the vehicle is observed to a brake hard then this may be an observation at block 320. Further, if more controlled braking is observed, this may also be an observation at block 320. In some embodiments, hard braking may be determined based on a deceleration rate being a greater than a threshold, for example.

An observation at block 320 may further track whether the vehicle stays in its lane or impedes on other lanes.

An observation at block 320 may further be the mechanical roadworthiness of the vehicle. For example, if the vehicle has lights that are not functioning, this may indicate that the vehicle may be unsafe. In other cases, if significant smoke is being emitted from the vehicle, this may indicate that the vehicle is unsafe. If parts of the vehicle are coming off, such as a hanging bumper, this may also indicate that the vehicle is unsafe. The tire tread may be observed in some cases, and a worn tire may indicate that the vehicles unsafe.

Further, the present disclosure is not limited to observations about other road users, but could also include observations about road hazards or conditions. For example, if a stop sign is obscured by a tree or bush, and is not visible until the last second by the vehicle sensors, the location and information about the stop sign could be noted and reported on. If there is debris on the roadway, or a significant pothole, the location and information about the hazard could be made and reported on.

In still further cases, the hazard may be temporal. For example, the sun may be directly in front of a reporting vehicle on a particular road at a particular time of day, or may be reflected from a building at a time of day. In other cases, an intersection may be deemed more hazardous during rush hour when people are in more of a hurry. Thus, the observation at block 320 may further include a time component. Further, as will be appreciated by those in the art, such time component may change between seasons if related to the sun's position.

Other observations may be made at block 320.

In addition to observing external road user behavior at block 320, the vehicle computing device may identify or partially identify the external road user and/or location at block 330.

In some cases, this may involve capturing an image/video of the external road user for processing at a server.

In some cases, this may involve capturing an image/video and doing some processing on the vehicle computing device. For example, the processing on the vehicle computing device may use image recognition technology to find the license plate of the external vehicle and derive a license plate number from such image.

In some cases, an image may be used to find the make, model, color, or other distinguishing features of the external road user.

In some cases, the communication subsystem may receive an intelligent transport system message from the other vehicle and use identifying information within such message.

In some cases, only a partial identification of the license plate may be available. For example, the image may have shading where parts of the license plate are unreadable, the license plate may be partially obscured, the license plate may be old and have some of the numbers or letters peeling and thus be indistinguishable from the background, among other factors. In this case, the partial identification may be stored for the external vehicle.

In some cases, vehicle identifying information may not be obtainable, but location information may be available. For example, if vehicle generating insights is driving by an intersection where an accident has occurred, vehicles involved with the accident may not be identifiable, but image processing may still allow for the identification that an accident has happened and the location of the accident.

Further, in some cases a hazard is being reported and in this case no identification of a specific road user is required, but rather the location of the hazard may be identified.

In some cases, both vehicle identification and location information may be captured.

Further, while the identification of block 330 may be for a vehicle, in some cases it may also be for the driver of the vehicle. In particular, a vehicle may be driven by multiple drivers, and the driving characteristics of each particular driver may influence the safety score for the vehicle. Therefore, in some cases images may be captured of the driver of the vehicle to further distinguish the external road user safety profile.

Based on the sensor data and observations, a safety score may be created for the external road user or location at block 340.

Based on the observations, a weighting factor may be applied to the safety score. For example, passing on a double line may be consider very unsafe and have a higher weighting factor for this behavior than a tail light being out, for example. The weighting factor may also be applied to positive behavior such as staying in the lane, braking gently, regularly signaling turns among other such positive behaviors.

Further, the weighting factor may be adjusted based on mitigating factors for the driving behavior. For example, if the driver leaves their lane to avoid an obstacle on the road, this behavior may be weighted less severely than a driver swerving because they appear impaired.

The weighting factor may therefore use factors based on behaviors that have been demonstrated to cause accidents. For example, the weighting factor for a first action observed may be different than the weighting factor for a second action observed based on an identified action type.

The safety score in some cases may be normalized based on the synthetic sensors being used at the vehicle. For example, if all vehicles reporting to a particular server use the same synthetic sensor, the output from the synthetic sensor may be normalized regardless of the vehicle manufacturer, sensor manufacturer, sensor drivers, etc., and thus allow for the combination of observations from a plurality of vehicles at the server.

In other cases, standards or normalization may be created between various synthetic sensors that may be implemented on a plurality of vehicles, again allowing a server to utilize the observations from a plurality of vehicles.

In other cases, synthetic sensor data may be provided to the server along with the other data, which may allow the server to normalize the data based on the synthetic sensor creating the data.

In FIG. 3, at block 350 the safety score from the synthetic sensor may be reported to the server. As indicated above, the safety score may be reported with other data such as identifying information for the location and/or the external road user, information about the synthetic sensors being used to create the safety score, among other data.

Further, in some embodiments, the safety score may not be derived at the vehicle computing device, but rather the report at block 350 may include information such as image captures, video, along with identifying information such as the location, or any information derived by the processing of the images at the vehicle. In this case, block 340 is optional and the server may derive the safety score.

Further, in some embodiments, the reporting at block 350 may not be continuous. For example, the vehicle may acquire a certain amount of information until a threshold information level has been reached, or may wait until a threshold time duration has been reached, among other options. When such threshold has been met, the vehicle computing device may send the report at block 350, which may include a compilation of the data since last reporting period in some cases.

Further, even if thresholds are being used, if an event is deemed to warrant immediate report, the reporting of block 350 may occur immediately. For example, if an accident is observed this may be a high priority event that may require immediate reporting. Other options are possible.

In some cases, the vehicle may be out of communication with a server, and the report at block 350 may be delayed until communication is re-established. For example, the vehicle may be driving in a remote region where cellular connectivity is not existent, among other options.

The report at block 350 may have security such as encryption to ensure the privacy of the information in some embodiments. Further, in some cases, to ensure the authenticity of the safety report, various modules such as synthetic sensor or the vehicle computing device may sign the report. The server may know the public key of the vehicle computing sensor or synthetic sensor to ensure the source of the report.

From block 350 the process then proceeds to block 360 and ends.

Figure 4:
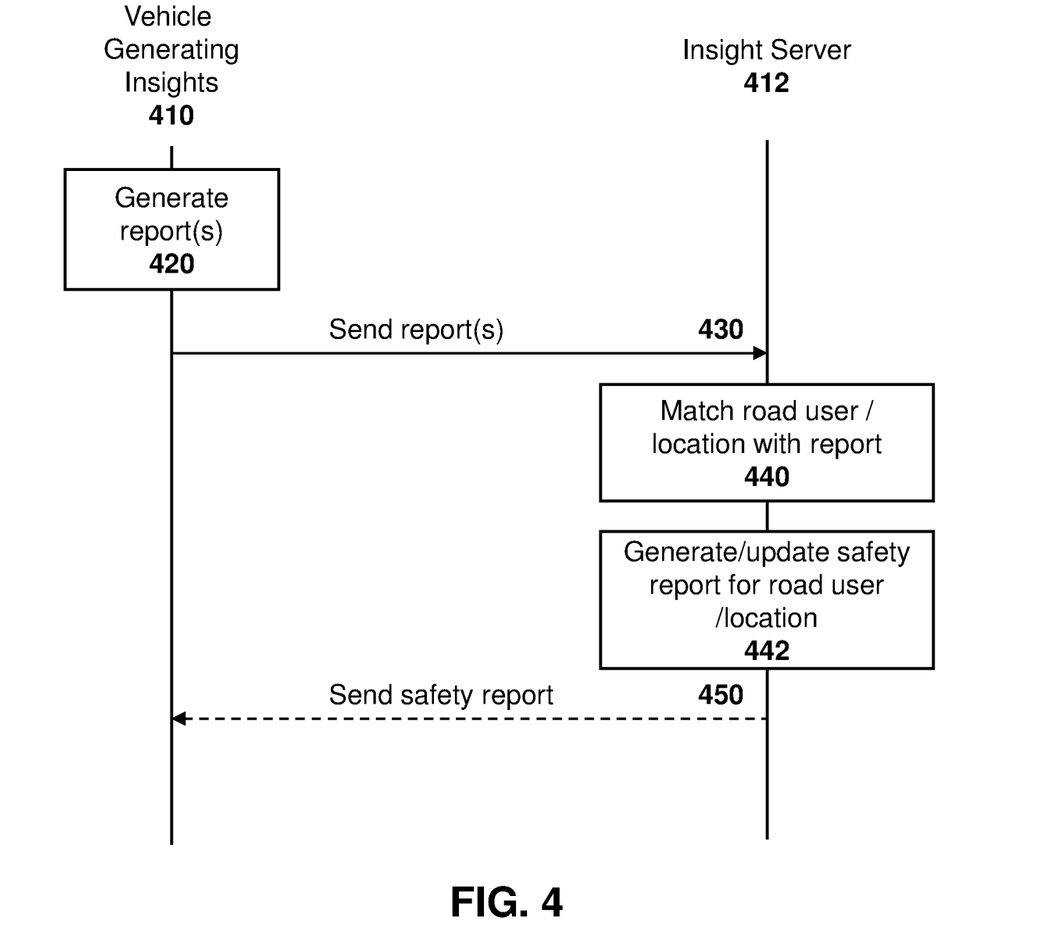
FIG. 4 is a dataflow diagram showing a safety report being sent from a reporting vehicle to a server and the server processing the report.

The sending of the report and the action taken by the server can be further seen in the embodiment of FIG. 4. In particular, in FIG. 4, a vehicle generating insights 410 may communicate with a server 412. Server 412 may be any server or cloud service which may receive communication from a plurality of vehicles 410, and may be considered a dangerous road user insight server. As will be appreciated by those in the art, the server could be part of any of core network 130, cloud services 140 or cloud domain 150 from the embodiment of FIG. 1.

In the embodiment of FIG. 4, vehicle 410 may generate one or more reports 420, for example utilizing the techniques of the embodiment of FIG. 3, and send the reports to the server 412, shown with message 430. As indicated with regard to block 350 of FIG. 3, the sending of the report at block 430 may include information such as identifying information for the location and/or vehicle, may include image data, raw sensor data, videos or other such information, may include information with regard to the synthetic sensor that is used to generate the report or the information within the report, among other such information. However, the present disclosure is not limited to the type of data sent in message 430, and more or fewer data fields may be provided in message 430.

Further, the report message 430 may be encrypted and/or signed for authenticity.

On receiving message 430, server 412 may first try to match each report within message 430 with identifying information for the location and/or the road user involved with the report.

For example, in some cases a complete license plate number may be provided within the report of message 430. In this case, the information received in the message may be associated with the vehicle with the license plate identified at block 440.

However, in some cases only partial information may be provided within the report message 430. In this case, server 412 may combine reports received from different vehicles to try to match the road user with the report information. For example, a plurality of reports may be received from a plurality of reporting vehicles. If such reporting vehicles are in geographic proximity with each other, the partial identification in the reports may be correlated in some cases.

For example, if a first report includes a time, location, make and model and color of a vehicle, along with a partial license plate, and a second report includes a second time, a second location, and make, model and colour of a vehicle, along with a different partial license plate, the server 412 may compare the two reports. For example, if the vehicle in the first report cannot have moved to the location of the second report within the time difference between the reports, the two vehicles cannot be correlated.

However, if the vehicle in the first report could possibly have moved to the position identified in the second report within the time difference between the two reports, and if identifying features for the vehicle match, a possible correlation may exist. In this case, if there is overlap between the partial license plate numbers then the two vehicle reports may be attributed to a single vehicle.

This is however merely one example and other methods of correlation would be apparent to those skilled in the art.

In some cases, the correlation may be performed on vehicle information stored at a database at server 412, for example from previous reports received about the vehicle.

The process of FIG. 4 then proceeds to block 442 in which the server 412 may generate or update a safety report for the road user and/or location. In particular, if no information existed for a vehicle identified at block 440, then a new safety report may be created for that vehicle.

However, if information about the vehicle already existed in a database, the safety score for the vehicle may be updated with the information from the new report. Further, in some cases the new data may be stored for later processing instead of, or in addition to, updating the score. For example, with more context, the data might be interpreted differently. Further, in some cases the score may not be able to be determined until more data is received.

Further, a confidence score for the safety report may be updated based on the fact that more information is now being received for the vehicle. In particular, the confidence that the vehicle is safe or unsafe may increase based on the fact that a plurality of reports has been received for the vehicle.

Further, in some cases, the confidence score may be increased more if the safety reports are received from different reporting vehicles than if a single vehicle is providing multiple reports for the same external road user.

For privacy, in some cases identifying information such as license plate information may be stored as a hash at server 412.

In some embodiments, as the safety information for vehicle is updated, a report 450 may be provided to various reporting vehicles 410, shown with message 450. However, message 450 is optional.

While the embodiment of FIG. 4 shows a report from a vehicle, in practice insight server 412 may further receive and process information from other sources. For example, traffic cameras at intersections may record behavior, and information about such behavior, including either processed information if a synthetic sensor is associated with the traffic camera, or raw information, is provided to server 412. In the case of raw information, insight server 412 may further include a synthetic sensor to process the data and provide a safety score that is consistent with the scores received in reports 430. This information can then be matched at block 440 and an updated safety report created for a road user and/or location performed at block 442.

In some embodiments, information may further come from police reports, city databases on accident statistics, closed circuit cameras, security cameras, city records for road construction, construction company databases, among other options. Such external information may be combined with the reports received from reporting vehicles to provide a comprehensive overview of driving hazards for a vehicle user.

Based on the embodiment of FIG. 4, a plurality of reporting vehicles may observe and generate safety scores for the road users and/or locations they see, and may upload these results to a server 412. Over time, a safety score may be created for road users typically seen on roadways in a particular area. In some cases, the safety score may vary based on a time of day, season or other temporal reference.

The safety score may improve with time as more vehicles and dangerous driving patterns are observed.

Good driving behaviors are also observed at the same time and may be fed into the safety score.

Performing an Action Based on Safety Reports

Figure 5:
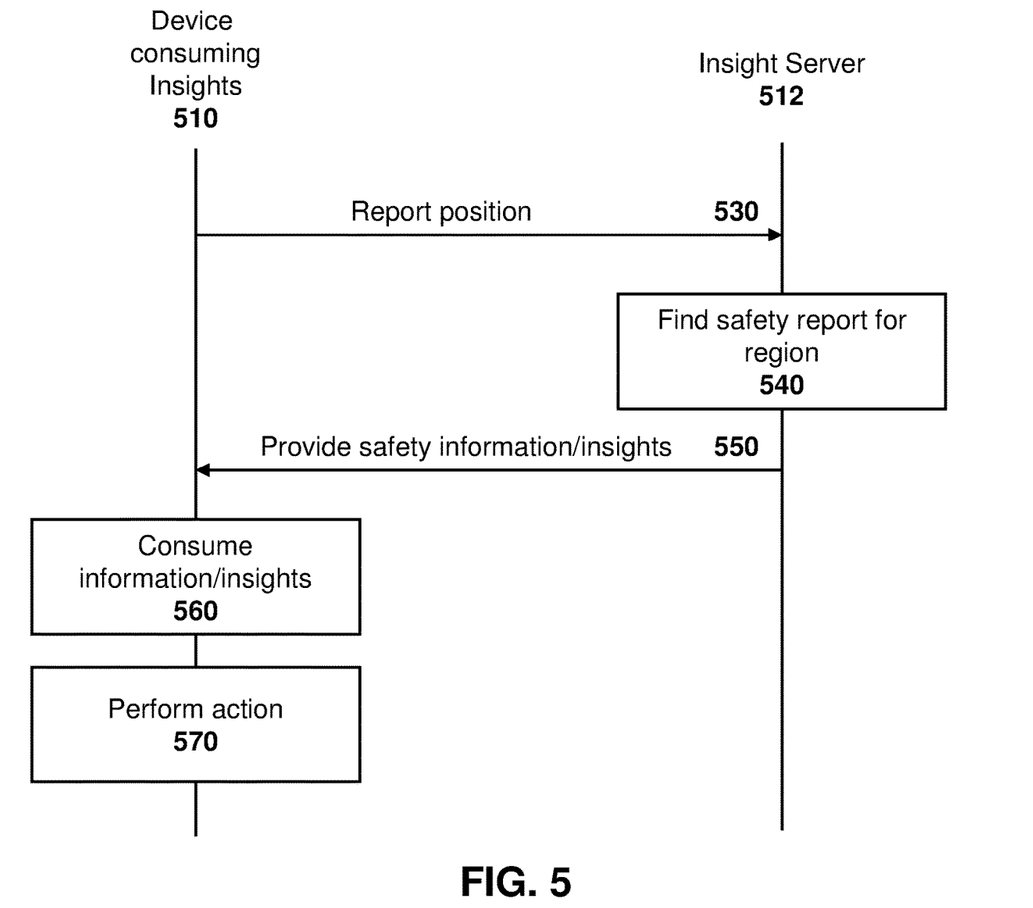
FIG. 5 is a dataflow diagram showing the receipt of reports by an insight consuming device and the taking of actions based on the report.

Once an insight server has information about a particular road user, a particular position, a geographic area, among other information, such information may be distributed to the various participants in the system and actions may be taken based on the reports. Reference is now made to FIG. 5.

In the embodiment of FIG. 5, a device consuming insights 510 communicates with an insights server 512. In particular, the device consuming insights may be a vehicle, a mobile device for a pedestrian, an infrastructure unit, among other options.

The device consuming insights 510 may, if it is mobile, report its position in message 530 to the insight server 512. In other cases, message 530 may be an indication that the device consuming insights is awake and wants an updated information message.

In some cases, message 530 may comprise a route that has been entered into a vehicle navigation system, indicating where the device currently is and where it intends to be at particular points in time. In some cases, message 530 may comprise only the starting point and destination of the trip.

In some cases, message 530 may comprise a location, speed and direction of travel.

Other information may also be provided in message 530.

On receiving message 530, at block 540 insight server 512 may create a safety report for device 510. For example, the safety report may be based on safety information within a region around the device 510. Such region may be set based on threshold distances from the location of device 510. In some cases, the threshold distances may vary depending on the speed, direction of travel, or other factors for device 510.

The safety report may in some cases provide information about specific vehicles. For example, the report may indicate that a red Honda Civic with license plate "ABC 123" is near and that this vehicle has a history of changing lanes without signalling.

In some cases, the report may anonymize information for privacy reasons. In this case, the report may indicate that one or more vehicles in the area have a history of changing lanes without signalling, but without giving information about the specific vehicle.

In some cases, the report may provide information about certain locations rather than, or in addition to, information about other road users. For example, the information may indicate that a particular intersection is dangerous. Such indication may be temporal and indicate that the particular intersection is dangerous at this time of day in some embodiments.

In some cases, the report may suggest routes for the device to follow to avoid hazards, dangerous areas, etc.

In some cases, the report will only include vehicles, other road users, locations, or hazards if the score given to such vehicles, other road users, locations, or hazards meets or exceeds a determined threshold.

In some cases, the threshold may be uniform for all road users in the system.

In some cases, the threshold may be configurable from device 510. For example, a "risk tolerance" profile may be set at device 510 to regulate the number of reports received.

In some cases, the report will not consider vehicles whose safety score has a confidence level under a threshold level.

The report may be sent as information or insights from server 512 to device 510 in message 550.

On receipt of message 550, the device 510 may consume the information at block 560 and perform an action at block 570. The action at block 570 can include various actions, and non-limiting examples are provided below.

In some cases, the action may be to provide an alert to a driver. This alert may use any user interface, and may for example include one or more of a display in the vehicle, audio feedback in the vehicle, or haptic feedback in the vehicle. For example, the infotainment system of the vehicle may include a display which can have an alert that dangerous drivers are around or that the vehicle is approaching a dangerous intersection. In other cases, the display may be a heads up display. Other options are possible.

In some cases, the audio alert may include tones or beeps indicating a hazard, or speech synthesis to provide particulars of the hazard.

In some cases, if a route has been planned, the action may be to propose an alternative route to avoid hazards. This may be provided on the navigation system as an alternative. For example, navigation systems often have options to choose the fastest route, the shortest route, to avoid toll roads, among other options. In this case, the navigation system may include the "safest route" as an option to the user and allow the user to select such route. Further, in some cases the "safest route" may be adaptive, and as dangerous vehicle enter the area the route may be changed. Thus, the dataflow of FIG. 5 may apply on a continual basis.

In some cases, the action may be to control the vehicle. For example, the control may be to apply brakes, to automatically change lanes, or to steer the vehicle to a safer route. This may be especially true if the vehicle is an autonomous vehicle, but may also be applicable if the vehicle has autonomous features such as intelligent cruise control, or the ability to override driver action in certain circumstances.

Security in the system of FIG. 5 may be established based on the use of certificates to register to the synthetic sensor system. For example, the system may be implemented during device manufacture, and thus the certificates for communication in the system may be installed at that time. In some cases, new certificates may be provisioned to devices 510. In each case, a trust relationship exists between device 510 and server 512 (and between vehicle 410 and server 412 from FIG. 4).

The embodiments of FIGS. 1 to 5 will work even if only a subset of vehicles or road users are part of the synthetic sensor system. In this case, the vehicles or road users that are part of the synthetic sensor system will observe other road users, not only those that are part of the synthetic sensor system.

The above domains, network elements, cloud services, nodes, vehicle computing devices and other computing platforms may be implemented using any computing device. One simplified diagram of a computing device is shown with regard to FIG. 6. The computing device of FIG. 6 could be any fixed or mobile computing device.

Figure 6:
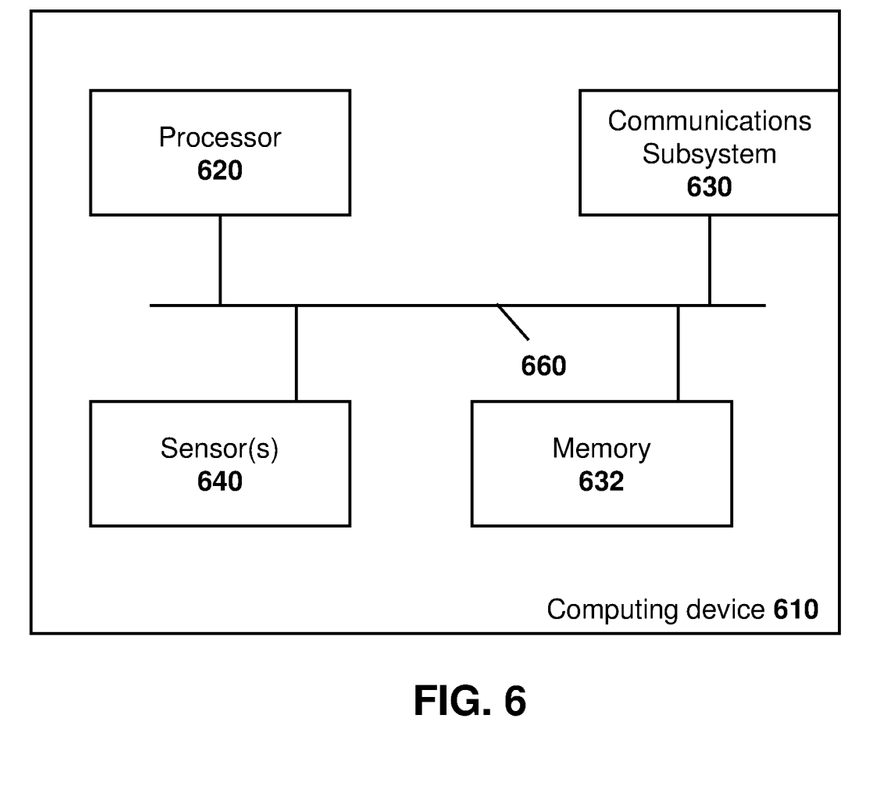
FIG. 6 is a block diagram of a simplified computing device capable of being used with the embodiments of the present disclosure.

In FIG. 6, device 610 includes a processor 620 and a communications subsystem 630, where the processor 620 and communications subsystem 630 cooperate to perform the methods of the embodiments described above. Communications subsystem 630 allows device 610 to communicate with other devices or network elements and may vary based on the type of communication being performed. Further, communications subsystem 630 may comprise a plurality of communications technologies, including any wired or wireless communications technology.

Processor 620 is configured to execute programmable logic, which may be stored, along with data, on device 610, and shown in the example of FIG. 6 as memory 632. Memory 632 can be any tangible, non-transitory computer readable storage medium which stores instruction code that, when executed by processor 620 cause device 610 to perform the methods of the present disclosure. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 632, device 610 may access data or programmable logic from an external storage medium, for example through communications subsystem 630.

In the example of FIG. 6, one or more sensors 640 may be associated with the computing device. However, this is optional and in some cases computing device 610 will not be associated with sensors.

Communications between the various elements of device 610 may be through an internal bus 660 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a computing device for a vehicle, the method comprising:
   obtaining, using sensors of the vehicle, sensor data relating to a behavior of an external road user;
   providing the sensor data to abstraction layers between the computing device and sensors of the vehicle to produce abstracted data;
   providing the abstracted data to a synthetic sensor to produce a normalized safety score for the external road user;
   recording identifying information for the external road user; and
   reporting the normalized safety score and identifying information to a server.

2. The method of claim 1, wherein the reporting comprises obtaining a threshold number of normalized safety scores for a plurality of external road users prior to sending a report to the server.

3. The method of claim 1, wherein the reporting comprises waiting a threshold time period from sending a first report to the sending of a second report.

4. The method of claim 1, wherein the behavior comprises at least one of: whether the external road user signals turns or lane changes; whether the vehicle is speeding; whether the vehicle is passing on an incorrect side; whether the vehicle brakes beyond a threshold braking rate; whether the vehicle is veering into another lane; whether the vehicle has functioning lights; whether the vehicle is emitting smoke; whether the vehicle has tire tread above a threshold level; whether the vehicle has parts that are partially detached from the vehicle; and whether the vehicle is following traffic regulations.

5. The method of claim 1, wherein the identifying information comprises a picture or video of the external road user.

6. The method of claim 1, wherein the identifying information comprises the computing device performing image processing to obtain at least one of a license plate number; a make; a model; a color; and markings for the external road user.

7. The method of claim 1, further comprising:
   receiving, at the computing device, a safety report from the server; and
   performing an action at the computing device.

8. The method of claim 7, wherein the action comprises at least one of:
   providing a notification regarding a dangerous road user to a user interface; and
   automatically performing a vehicle maneuver at the vehicle.

9. The method of claim 7, wherein the safety report comprises areas to avoid based on road users having a safety score below a safety threshold level and a confidence level above confidence threshold level being in the areas.

10. A computing device for a vehicle, the computing device comprising:
    a processor; and
    a communications subsystem, wherein the computing device is configured to:
    obtain, using sensors of the vehicle, sensor data relating to a behavior of an external road user;
    provide the sensor data to abstraction layers between the computing device and sensors of the vehicle to produce abstracted data;
    provide the abstracted data to a synthetic sensor to produce a normalized safety score for the external road user;
    record identifying information for the external road user; and
    report the normalized safety score and identifying information to a server.

11. The computing device of claim 10, wherein the computing device is configured to report by obtaining a threshold number of normalized safety scores for a plurality of external road users prior to sending a report to the server.

12. The computing device of claim 10, wherein the computing device is configured to report by waiting a threshold time period from sending a first report to the sending of a second report.

13. The computing device of claim 10, wherein the behavior comprises at least one of: whether the external road user signals turns or lane changes; whether the vehicle is speeding; whether the vehicle is passing on an incorrect side; whether the vehicle brakes beyond a threshold braking rate; whether the vehicle is veering into another lane; whether the vehicle has functioning lights; whether the vehicle is emitting smoke; whether the vehicle has tire tread above a threshold level; whether the vehicle has parts that are partially detached from the vehicle; and whether the vehicle is following traffic regulations.

14. The computing device of claim 10, wherein the identifying information comprises the computing device performing image processing to obtain at least one of a license plate number; a make; a model; a color; and markings for the external road user.

15. The computing device of claim 10, wherein the computing device is further configured to:
    receive a safety report from the server; and
    perform an action at the computing device.

16. The computing device of claim 15, wherein the action comprises at least one of: providing a notification regarding a dangerous road user to a user interface; and automatically performing a vehicle maneuver at the vehicle.

17. The computing device of claim 15, wherein the safety report comprises areas to avoid based on road users having a safety score below a safety threshold level and a confidence level above confidence threshold level being in the areas.

18. A non-transitory computer readable medium for storing instruction code, which, when executed by a processor of a computing device for a vehicle cause the computing device to:
    obtain, using sensors of the vehicle, sensor data relating to a behavior of an external road user;
    provide the sensor data to abstraction layers between the computing device and sensors of the vehicle to produce abstracted data;
    provide the abstracted data to a synthetic sensor to produce a normalized safety score for the external road user;
    record identifying information for the external road user; and
    report the normalized safety score and identifying information to a server.

* * * * *